Aug. 10, 1926.

L. M. BOOTH 1,595,066

SETTLING TANK

Filed July 22, 1925

2 Sheets-Sheet 1

Levis Miller Booth
INVENTOR

BY Henry M. Bingham
his ATTORNEY

Aug. 10, 1926.
L. M. BOOTH
SETTLING TANK
Filed July 22, 1925
1,595,066
2 Sheets-Sheet 2
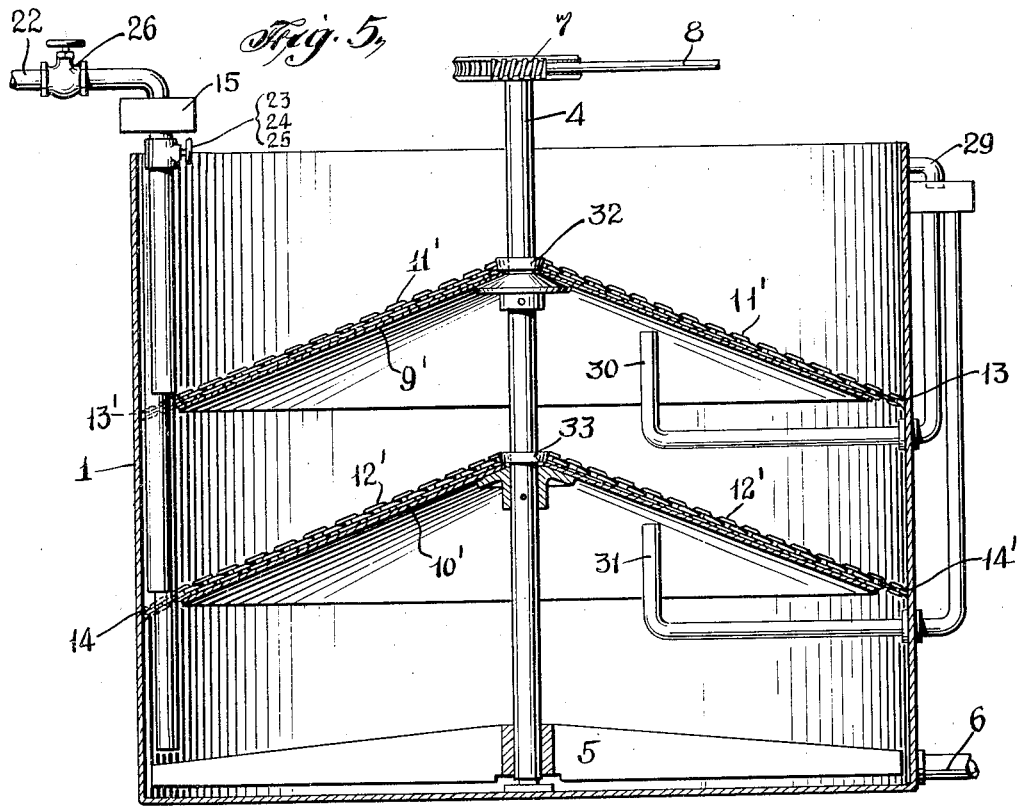
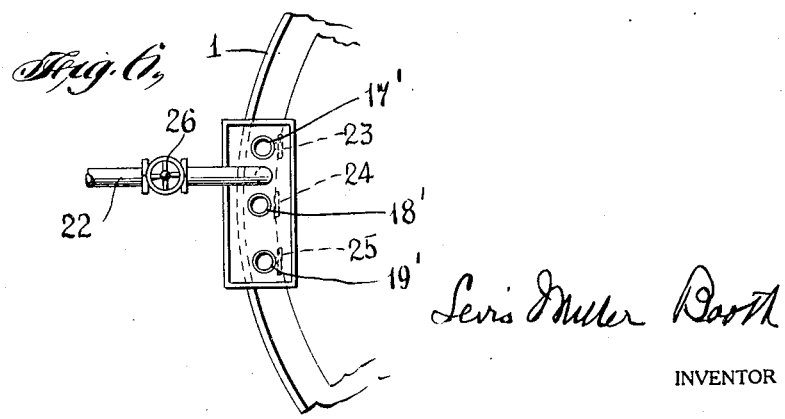
Lewis Miller Booth
INVENTOR
BY Henry H. Bagham
ATTORNEY Patented Aug. 10, 1926.

1,595,066

UNITED STATES PATENT OFFICE.

LEVIS MILLER BOOTH, OF PLAINFIELD, NEW JERSEY.

SETTLING TANK.

Application filed July 22, 1925. Serial No. 45,213.

My invention relates to settling tanks for separating suspended matter from liquids and is adaptable for use in purification of water, recovery of pulp from water suspensions and in all processes where solids may be separated from liquids by sedimentation. The objects of my invention are to increase the settling areas of tanks and to provide a tank which will be inexpensive to construct, which will have a maximum settling capacity and will occupy a minimum of floor space. The other objects will be more fully pointed out in the following specifications.

Figure 1:
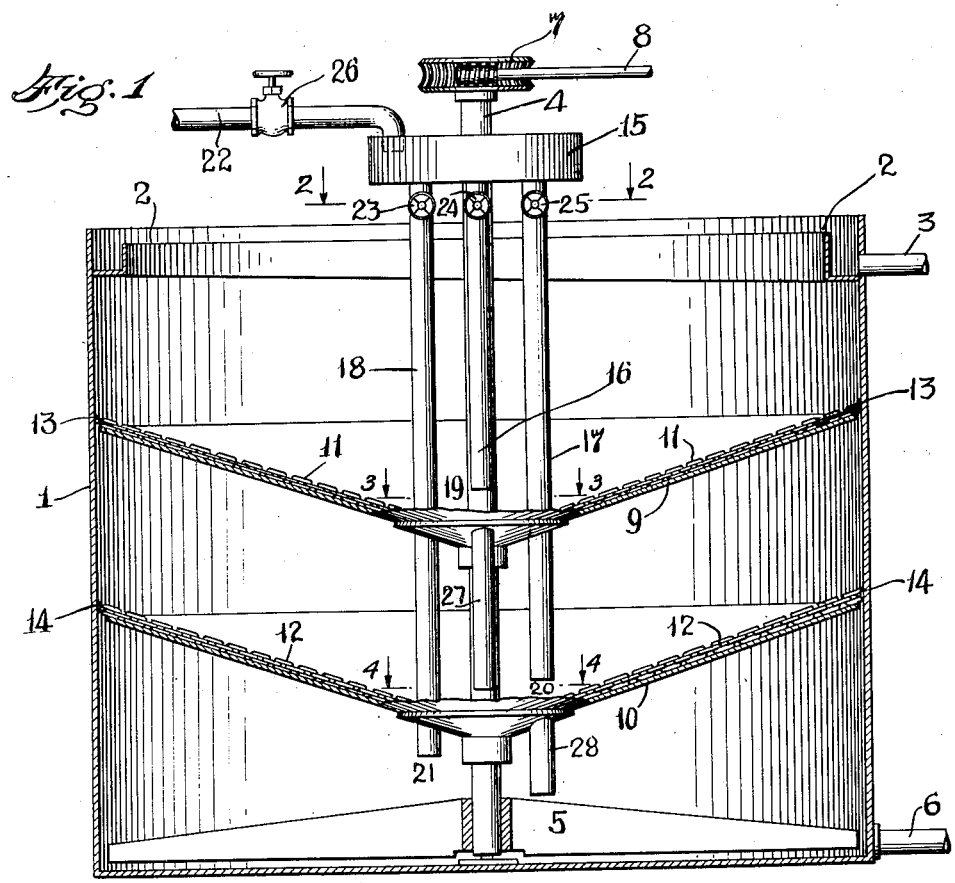
Figure 2:
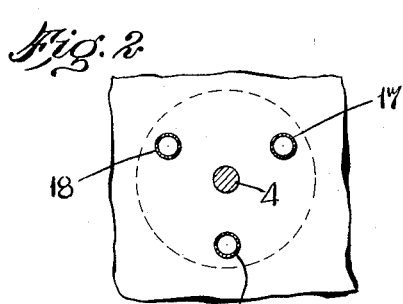
Figure 3:
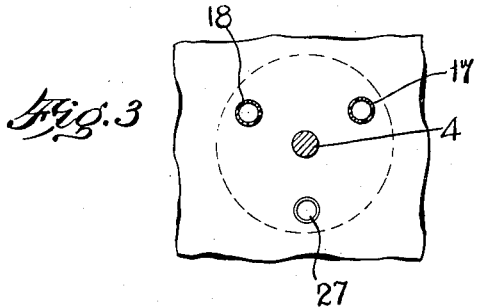
Figure 4:
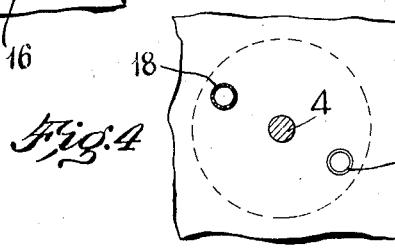

I obtain these objects by the mechanism illustrated in the accompanying drawings in which Figure 1 is a vertical section of my settling tank. Figure 2 is a cross section on the line 2—2 of Figure 1. Figure 3 is a cross section on the line 3—3 of Figure 1. Figure 4 is a cross section on the line 4—4 of Figure 1. Figure 5 is a vertical section of a modification of my tank. Figure 6 is a plan view, partly broken away, of the distributing box and feed pipe shown in Figure 5. Similar numerals refer to similar parts throughout the several views.

My settling tank 1 is equipped with a circumferential outlet launder 2 near the top. This is in communication with a clarified effluent outlet 3. 4 is a central slowly revolving shaft which carries an agitator 5 operating near the bottom of the tank. 6 is the outlet for the settled stock. The shaft 4 is driven through worm gearing 7 and shaft 8.

The shaft 4 also carries conical settling shelves 9 and 10 on the upper concave surfaces of which rest loosely the flexible scrapers 11 and 12 which are attached to the wall of the tank at 13 and 14. The scrapers are preferably in the form of chains which readily conform to the upper face of the settling shelves.

The liquid suspension which is to be treated is introduced into a distributing box 15 carried by the shaft 4. Outlet conduits 16, 17 and 18 from the distributing box 15 supply to the settling zones 19, 20 and 21, the quota for each of the respective zones. Means for controlling the relative amounts of liquid applied through the inlet pipe 22 are provided by valves 23, 24 and 25. See Figure 1. The quantity supplied to the box 15 by the pipe is regulated by the valve 26.

Each of the conical revolving settling shelves 9 and 10 mounted on the shaft 4 is provided with outlet orifices or conduits 27 and 28 whereby the settled stock is discharged from near the apex of the settling shelves 9 and 10 to the respective zones beneath. See Figures 3 and 4. There are spaces between the shelves 9 and 10 and the tank 1 for unrestricted up-flow of the clarified liquid from the settling zones 20 and 21.

Figure 5 illustrates in sectional elevation a modification of my invention the tank being equipped with revolving settling shelves wherein the convex surfaces of the conical shelves serve as sedimentation areas. In this case the inlets 17, 18 and 19 are located near the circumference, see Figure 6. The clarified effluent is withdrawn through the pipes 29, 30 and 31 positioned approximately as shown. In this case as in Figure 1 the scrapers 11 and 12 are attached to the tank at 13 and 14. These scrapers are held in position by means of collars 32 and 33 surrounding the shaft 4.

The slow rotation of the shaft 4, carrying the shelves 9 and 10 in each case passing beneath the scrapers 11 and 12 which are secured to the tank 1, serves to discharge the settled stock from the conical settling shelves to the lowest compartment from which it may be withdrawn through the outlet 6. The number and form of the settling shelves may be varied to suit requirements.

What I claim is:—

1. A stationary single compartment settling tank, a settling shelf of lesser diameter than said tank positioned within and above the bottom of said tank, means for rotating said settling shelf, means for supplying liquid suspension to said tank above and below said settling shelf, a scraper secured to said tank above the upper surface of said settling shelf, means for withdrawing the sediment from said tank below said settling shelf and means for withdrawing the clarified effluent from said tank at a point above said shelf.

2. A stationary single compartment settling tank, a settling shelf of lesser diameter than said tank positioned within and above the bottom of said tank, means for rotating said settling shelf, means for supplying liquid suspension to said tank above and below said settling shelf, a scraper secured to said tank above the upper surface of said settling shelf, a scraper secured to said means for rotating said settling shelf and positioned adjacent to the bottom of said settling tank, means for withdrawing the sediment from said tank below said settling shelf and means for withdrawing the clarified effluent from the tank at a point above said shelf.

3. A stationary single compartment settling tank, a plurality of settling shelves of lesser diameter than said tank positioned within and above the bottom of said tank and spaced from each other, means for rotating said settling shelves, means for supplying liquid suspension to such tank above and below each of said settling shelves, scrapers secured to said tank above the upper surface of each settling shelf, means for withdrawing the sediment from said tank below the lowermost of said settling shelves and means for withdrawing the clarified effluent from said tank at a point above the uppermost settling shelf.

4. A stationary single compartment settling tank, a plurality of settling shelves of lesser diameter than said tank arranged one above the other within said tank and positioned within and above the bottom of said tank and spaced from each other, means for rotating said settling shelves, means for supplying liquid suspension to said tank above and below each settling shelf, scrapers secured to said tank above the upper surface of each of said settling shelves, a scraper secured to said means for rotating said settling shelves and positioned adjacent to the bottom of said settling tank, means for withdrawing the sediment from said tank below the lowermost settling shelf and means for withdrawing the clarified effluent from the tank at a point above the uppermost of said settling shelves.

5. A stationary single compartment settling tank, a settling shelf of lesser diameter than said tank positioned within and above the bottom of said tank, means for rotating said settling shelf, means for supplying liquid suspension to said tank above and below said settling shelf, means for withdrawing the sediment from said tank below said settling shelf and means for withdrawing the clarified effluent from said tank at a point above said shelf.

July 21, 1925.

LEVIS MILLER BOOTH.